United States Patent
McClure et al.

(10) Patent No.: US 8,916,795 B2
(45) Date of Patent: Dec. 23, 2014

(54) PLASMA ACTUATED VORTEX GENERATORS

(75) Inventors: Paul D. McClure, Fort Worth, TX (US); Dennis B. Finley, Granbury, TX (US); Sergey Macheret, Palmdale, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 784 days.

(21) Appl. No.: 13/073,549

(22) Filed: Mar. 28, 2011

(65) Prior Publication Data

US 2012/0248072 A1    Oct. 4, 2012

(51) Int. Cl.
*B23K 10/00* (2006.01)
*F02C 7/04* (2006.01)
*F03D 1/06* (2006.01)
*B64C 23/00* (2006.01)
*B64C 23/06* (2006.01)

(52) U.S. Cl.
CPC ......... *B64C 23/005* (2013.01); *F05D 2240/127* (2013.01); *F02C 7/04* (2013.01); *B64C 2230/26* (2013.01); *Y02E 10/721* (2013.01); *F05D 2270/172* (2013.01); *F05B 2240/122* (2013.01); *Y02T 50/166* (2013.01); *Y02T 50/162* (2013.01); *B64C 2230/12* (2013.01); *F03D 1/0675* (2013.01); *B64C 23/06* (2013.01)
USPC ............ 219/121.51; 219/121.48; 219/121.52; 244/199.1; 244/199.3

(58) Field of Classification Search
CPC .............................. H05B 31/26; B21C 21/00
USPC ........... 219/121.51, 121.52, 121.48; 244/205, 244/199.1, 199.2, 199.3
See application file for complete search history.

(56) References Cited

U.S. PATENT DOCUMENTS

| | | | |
|---|---|---|---|
| 5,243,169 A * | 9/1993 | Tateno et al. ............ | 219/121.51 |
| 5,374,802 A * | 12/1994 | Dorfman et al. ......... | 219/121.52 |
| 6,805,325 B1 * | 10/2004 | Malmuth et al. ............. | 244/205 |
| 7,744,039 B2 | 6/2010 | Miles et al. | |
| 8,523,115 B2 * | 9/2013 | Essenhigh et al. ............ | 244/205 |
| 2007/0119827 A1 * | 5/2007 | Miller et al. ............. | 219/121.51 |
| 2008/0116808 A1 | 5/2008 | McClure et al. | |
| 2008/0277004 A1 | 11/2008 | Hagseth et al. | |
| 2009/0212164 A1 * | 8/2009 | Osborne et al. ................ | 244/205 |
| 2010/0004799 A1 * | 1/2010 | Drouin et al. ..................... | 701/3 |
| 2010/0133386 A1 * | 6/2010 | Schwimley et al. .......... | 244/205 |
| 2010/0176249 A1 | 7/2010 | Schwetzler | |
| 2010/0308177 A1 | 12/2010 | McClure | |
| 2012/0074263 A1 * | 3/2012 | Hansen et al. ................ | 244/205 |
| 2013/0001368 A1 * | 1/2013 | Silkey et al. .................. | 244/205 |

FOREIGN PATENT DOCUMENTS

| | | |
|---|---|---|
| DE | 102006028614 A1 | 1/2008 |
| EP | 1995173 A1 | 11/2008 |
| EP | 2230175 | 9/2010 |
| WO | 2009053984 | 4/2009 |
| WO | 2010014924 | 2/2010 |

OTHER PUBLICATIONS

Dorian Colas et al., Novel Electrode Configuration for Ionic Wind Generation in Air at Atmospheric Pressure, 3rd European Conference for Aerospace Sciences, 2009, 7 pp.

* cited by examiner

*Primary Examiner* — Mark Paschall
(74) *Attorney, Agent, or Firm* — Reising Ethington P.C.; John J. Snyder

(57) ABSTRACT

A plasma-actuated vortex generator arrangement includes a plurality of spaced-apart vortex generators, and a plasma actuator distributed amongst the plurality of vortex generators.

20 Claims, 4 Drawing Sheets

PLASMA ACTUATED VORTEX GENERATORS

BACKGROUND

1. Technical Field

This invention relates generally to fluid handling and, more particularly, to vortex generators.

2. Description of the Related Art Including Information Disclosed Under 37 CFR 1.97 and 1.98

Various aerodynamic and hydrodynamic applications, including aeronautical, marine, and other applications, involve relative fluid flow across a surface. Examples include fluid flows over an aircraft wing or engine inlet, a watercraft hull or rudder, a wind turbine blade, and the like. During relative motion between a viscous fluid and a surface of a body across which the fluid flows, layers of fluid flow can be identified. Of those, the fluid flow layer closest to the body surface is known as the boundary layer.

The boundary layer is characterized by fluid laminae that decrease in fluid velocity relative to the body surface as a function of proximity to the surface. The flow in the boundary layer may be laminar wherein fluid laminae of different velocities create a smoothly-varying velocity profile to follow the contour of the surface. Downstream, however, the fluid flow in the boundary layer becomes turbulent wherein additional time dependent velocity perturbations occur in the fluid, creating additional mixing, however the mean flow continues to follow the contour of the surface. This turbulent boundary layer has higher mean velocities near the surface due to the additional mixing and is less susceptible to separation than a laminar boundary layer. In geometry regions where the surface turns too rapidly, or shock waves occur, the fluid flow may separate from the body surface, resulting in relatively low pressure and reversed flow near the body surface, thereby contributing to increased drag, a reduction in lift, or reduced control effectiveness.

Accordingly, vortex generators are used on body surfaces to delay and/or reduce flow separation and thereby reduce drag, increase lift, and/or increase control effectiveness. Vortex generators may include fins that extend from a body surface into higher velocity fluid flow and create tip vortices that draw higher velocity fluid toward the body surface through lower velocity fluid flow regions to energize the boundary layer and thereby promote flow attachment to the body surface. Vortex generators are particularly well suited to maintain attached flow across body surfaces disposed at large angles-of-attack to the relative wind, or across body surfaces with steep slopes, like a deflected flap or aileron or in an inlet duct to an engine. Conventional vortex generators are effective devices but their quantity and size can create counterproductive parasitic drag at off-design operating conditions.

BRIEF SUMMARY

A plasma-actuated vortex generator arrangement includes a plurality of vortex generators in the form of elements that extend from a body surface over which a working fluid flows, the vortex generators being spaced apart from one another along a spaced direction transverse to a direction of travel of the working fluid, to allow a working fluid to flow between them. The plasma-actuated vortex generator also includes a plasma actuator distributed amongst the plurality of vortex generators. The plasma actuator is configured to generate an electric field between the vortex generators and induce fluid flow from at least one of the vortex generators to at least one other of the vortex generators across a space between the vortex generators.

In another embodiment, a plasma-actuated vortex generator arrangement includes a first vortex generator, a second vortex generator located adjacent to the first vortex generator with a space between them, and a plasma actuator distributed amongst the first and second vortex generators. The plasma actuator includes a first upstream electrode carried by the first vortex generator, and a first downstream electrode carried by the second vortex generator in a location downstream of the first electrode. The plasma actuator generates an electric field between the vortex generators and induces fluid flow from one of the vortex generators to another of the vortex generators across the space between the vortex generators. According to one aspect of this embodiment, the plasma actuator is an AC dielectric barrier discharge plasma actuator. According to another aspect of this embodiment, the plasma actuator is a DC ion wind plasma actuator.

In a further embodiment, a plasma-actuated vortex generator arrangement includes a first vortex generator in the form of an element that extends from a body surface over which a working fluid flows, a pair of adjacent vortex generators in the form of elements that extend from a body surface over which a working fluid flows, the pair of vortex generators being spaced apart from one another along a spaced direction transverse to a direction of travel of the working fluid and located downstream of the first vortex generator, and a DC corona discharge plasma actuator distributed amongst the vortex generators. The plasma actuator includes a first electrode carried by a trailing portion of the first vortex generator, a pair of second electrodes carried by downstream portions of the pair of adjacent vortex generators, and a pair of ground electrodes between the first and second electrodes and carried by upstream portions of the pair of adjacent vortex generators. The plasma actuator generates an electric field between the vortex generators and induces fluid flow across a space between the vortex generators from the first vortex generator to the pair of adjacent vortex generators.

In an additional embodiment, a plasma-actuated vortex generator arrangement includes a plurality of spaced-apart vortex generators carried on a body surface, and a plasma actuator distributed amongst the plurality of vortex generators and the body surface and configured to generate an electric field between a location on the body surface and at least one of the vortex generators and induce fluid flow between the location on the body surface and at least one of the vortex generators across a space between the vortex generators.

In yet another embodiment, a plasma-actuated vortex generator arrangement includes a plurality of spaced-apart vortex generators carried on a body surface, and disposed adjacent with respect to one another on either side of a longitudinal axis L and in the same direction with respect to a direction of travel of a working fluid so as to generate co-rotating vortices. The arrangement also includes a plasma actuator distributed amongst at least the plurality of vortex generators and configured to induce fluid flow across a space between the vortex generators.

BRIEF DESCRIPTION OF THE SEVERAL VIEWS OF THE DRAWINGS

These and other features and advantages will become apparent to those skilled in the art in connection with the following detailed description and drawings of one or more embodiments of the invention, in which.

DETAILED DESCRIPTION

Figure 1:
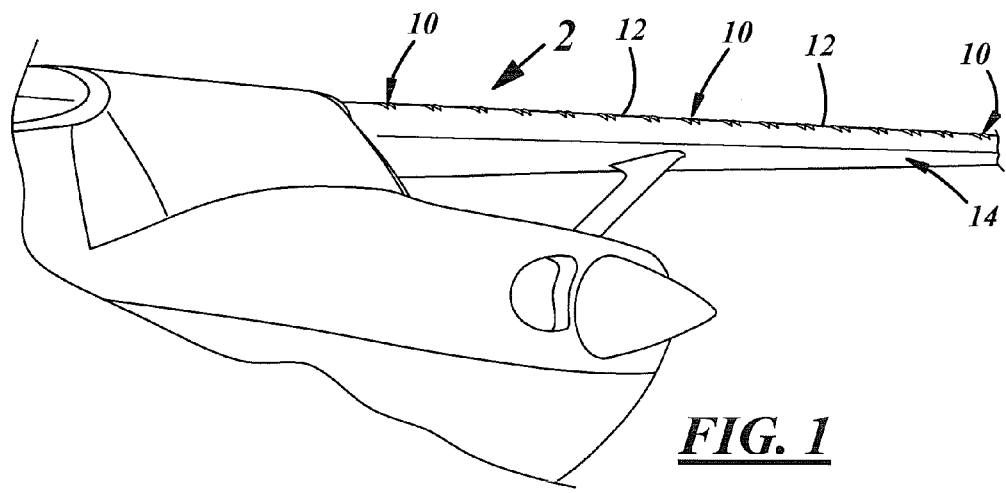
FIG. 1 is a fragmentary perspective view of an example embodiment of plasma actuated vortex generators on a surface of a body across which a viscous fluid flows.
Figure 2:
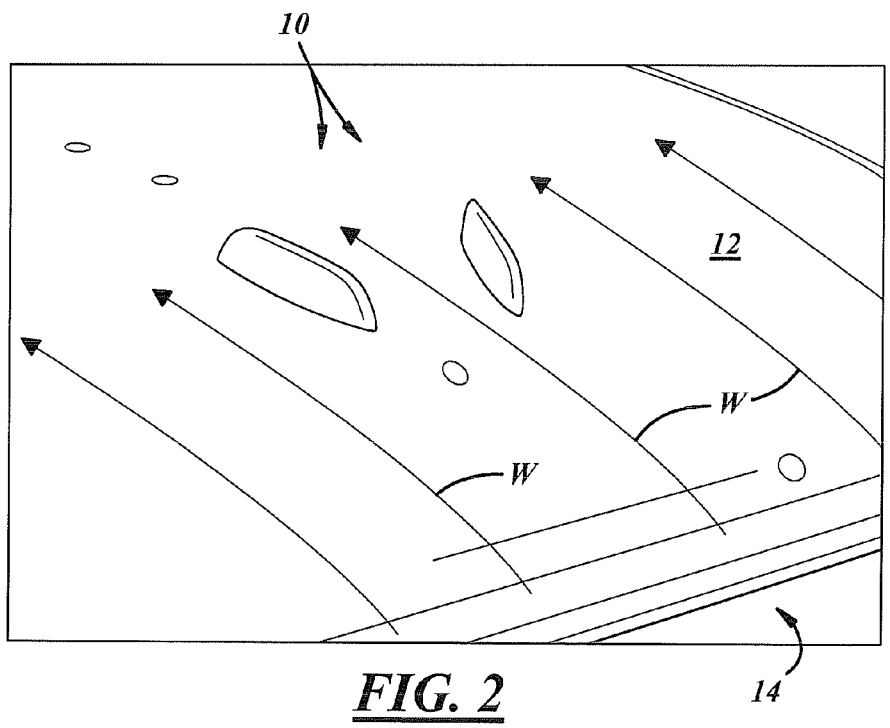
FIG. 2 is an enlarged fragmentary view of one pair of the vortex generators taken along arrow 2 of FIG. 1.

FIGS. 1 and 2 illustrate an exemplary embodiment of plasma actuated vortex generators 10 carried on a surface 12 of a body 14 over which a viscous working fluid W flows. The vortex generators 10 may be separate elements mounted, fastened, or coupled in any other suitable manner to the body surface 12, or may be elements integral with the body surface 12. The vortex generators 10 may be disposed at any suitable angle(s) of attack with respect to the flow of working fluid W over the surface 12. The vortex generators 10 are spaced apart with a space between them through which the working fluid W flows. Also, the vortex generators 10 may be fin-shaped, blade-shaped, or aerofoil-shaped as shown, but may take on any other suitable shape(s). A vortex appears at a downstream tip of each vortex generator 10, and an angle between the adjacent vortex generators 10 may create counter-rotating vortices or vortex pairs. In another embodiment, the vortex generators 10 may be arranged in parallel to create co-rotating vortices, as will be discussed in further detail below with respect to FIG. 9.

Example embodiments will be described and illustrated with reference to its use in an aircraft wing environment. However, it will be appreciated as the description proceeds that the invention is useful in many different applications and may be implemented in many other embodiments. In this regard, and as used herein and in the claims, it will be understood that the term "body" refers not only to aircraft wing applications, but also to aircraft fuselages, automobile bodies, watercraft hulls, windmill impellers, marine propellers, turbine engine rotors and stators, helicopter rotors, and various other applications, and regardless of the type of working fluid used in conjunction with the body.

Figure 3:
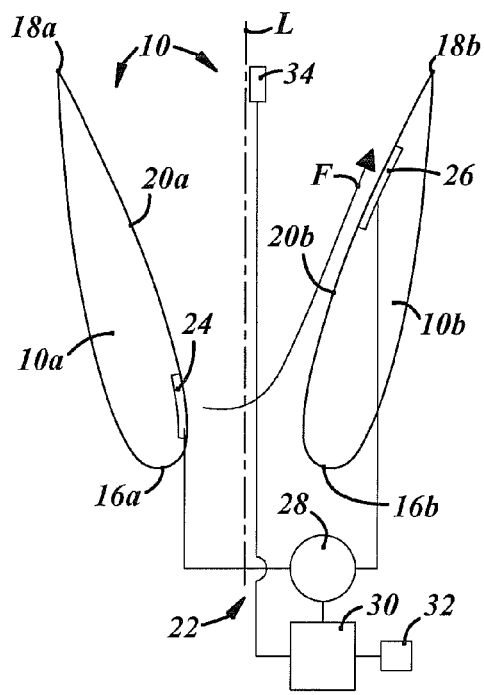
FIG. 3 is a schematic view of one embodiment of a pair of adjacent vortex generators having a DC ion wind plasma actuator distributed amongst the vortex generators.

Referring now to FIG. 3, the vortex generators 10 may include a pair of individual first and second vortex generators 10a, 10b that may be disposed side-by-side or adjacent with respect to one another on either side of a longitudinal axis L. In this embodiment, the vortex generators 10a, 10b may be disposed at opposed angles and in different directions with respect to a direction of travel of a working fluid W and/or the axis L. The first and second vortex generators 10a, 10b may include upstream ends 16a, 16b, downstream ends 18a, 18b, and inboard surfaces 20a, 20b facing one another at an angle between the ends 16a, 16b, 18a, 18b. The vortex generators 10 include a plasma actuator 22 distributed amongst the first and second vortex generators 10a, 10b.

The plasma actuator 22 includes an upstream electrode 24 that may be carried by the first vortex generator 10a, and a downstream electrode 26 that may be carried by the second vortex generator 10b at a location downstream of the upstream electrode 24. More specifically, the upstream electrode 24 may be carried by the inboard surface 20a proximate the upstream end 16a of the first vortex generator 10a, and the downstream electrode may be carried by the inboard surface 20b proximate the downstream end 18b of the second vortex generator 10a. The electrodes 24, 26 may be directly exposed to the fluid flow and may be flush with the inboard surfaces 20a, 20b. In another embodiment, the upstream electrode 24 instead may be carried by the second vortex generator 10b, and the downstream electrode may be carried by the first vortex generator 10a. As used herein, the phrase "proximate the upstream end" refers to the portion of the vortex generator 10a, 10b which sees the initial fluid flow, and the phrase "proximate the downstream end" refers to regions of the vortex generator 10a, 10b which sees fluid flow that has traversed some distance downstream from the upstream end, whether in a direction chord-wise aft, or in a direction from a tip of one vortex generator to a root of another vortex generator.

The plasma actuator 22 also may include a power supply 28 in suitable power communication between the upstream and downstream electrodes 24, 26, a controller 30 in suitable control communication with the power supply 28, and one or more sensors 32, 34 in suitable monitoring communication with the controller 30. In one embodiment, the upstream electrode 24 may be coupled to the power supply 28 and the downstream electrode 26 may be coupled to ground. In the illustrated embodiment, the plasma actuator 22 is an ion wind type of device, wherein the power supply 28 is a relatively high voltage direct current (DC) power supply. Although not separately shown, the power supply 28 may include any suitable switches, relays, or the like in communication with the controller 30. The sensors 32, 34 may include any suitable devices to sense fluid flow, temperature, pressure, or any other suitable parameters.

In general, the controller 30 may receive and process input from the sensors 32, 34 and any other suitable input devices in light of stored instructions and/or data, and transmit output signals to the power supply 28 and any other suitable devices. The controller 30 may be programmed to direct the power supply 28 to provide high voltage electricity or electrical pulses to the upstream electrode 24 for generation of powerful electrical fields between the electrodes 24, 26, and to ionize fluid between the upstream electrode 24 and the downstream electrode 26. In the case of electrical pulses applied to the electrode 24, such pulses may be as short as several nanoseconds, or as long as is required, and can also be repeated at either very high rate (up to some number of MHz) in order to efficiently ionize the flow or at low rate (from several Hz to perhaps several kHz) in order to provide a resonance with some natural motions of the boundary layer. The electrical pulses can also be combined with DC or AC voltage applied to the same set of electrodes. The ionized fluid is accelerated by electrostatic forces generated by the fields between the electrodes 24, 26, and thereby manipulates the flow of working fluid W between the vortex generators 10. Flow acceleration will proceed from the smaller electrode toward the larger electrode regardless of DC voltage polarity. Accordingly, the upstream electrode 24 may be smaller than the downstream electrode 26. The terms "larger" and "smaller" refer to a relative area ratio of, for example, from 1:1 to 1000:1 or more as the upstream electrode could be a very fine wire.

The controller 30 may include, for example, an electrical circuit, an electronic circuit or chip, and/or a computer. Although not separately shown, in the computer embodiment, the controller 30 generally may include a processor, memory that may be coupled to the processor, and one or more interfaces coupling the controller 30 to one or more other devices. Although not shown, the controller 30 and other powered system devices may be supplied with electricity by a relatively low voltage power supply, for example, one or more batteries, fuel cells, or the like, combined with a transformer that steps up voltage to that required to create plasma and significant electrostatic body forces.

The controller processor may execute instructions that provide at least some of the functionality for the plasma actuated vortex generators 10. As used herein, the term instructions may include, for example, control logic, computer software and/or firmware, programmable instructions, or other suitable instructions. The processor may include, for example, one or more microprocessors, microcontrollers, application specific integrated circuits, programmable logic devices, field programmable gate arrays, and/or any other suitable type of electronic processing device(s).

Also, the controller memory may be configured to provide storage for data received by or loaded to the controller, and/or for processor-executable instructions. The data and/or instructions may be stored, for example, as look-up tables, formulas, algorithms, maps, models, and/or any other suitable format. The memory may include, for example, RAM, ROM, EPROM, and/or any other suitable type of storage article and/or device.

Further, the controller interfaces may include, for example, analog/digital or digital/analog converters, signal conditioners, amplifiers, filters, other electronic devices or software modules, and/or any other suitable interfaces. The interfaces may conform to, for example, RS-232, parallel, small computer system interface, universal serial bus, and/or any other suitable protocol(s). The interfaces may include circuits, software, firmware, or any other device to assist or enable the controller 30 in communicating with other devices.

In operation, the controller 30 may activate the power supply 28 in any suitable manner to apply high voltage from the upstream electrode 24 to the downstream electrode 26 between the vortex generators 10a, 10b. The high voltage causes at least some of the fluid between the electrodes 24, 26 to ionize and creates an electric field that induces a body force impulse on the ionized fluid to induce a fluid flow as shown by arrow F. The induced fluid flow F will accelerate flow of fluid between the vortex generators 10, thereby enhancing the turning of off-body fluid flow and delaying flow separation. Also, the induced fluid flow F proceeds from one of the vortex generators 10a to another of the vortex generators 10b across a space between the vortex generators 10, and does not merely flow along one surface of one vortex generator. As used herein, the terminology "across a space" includes partially or entirely across a space. Accordingly, the presently disclosed plasma actuated vortex generators 10 provide a plasma-working fluid interaction region of greater volume compared to conventional plasma actuators. The upstream electrode on the vortex generator 10a may be at the same elevation or distance from the wing surface as the downstream electrode on the other vortex generator 10b, or it may be at a different relative distance from the wing surface.

The plasma actuator 22 may be tuned to actual flight conditions via time-dependent pulsing to improve vortex generator performance and leverage resonant frequencies of the working fluid flow. For example, the plasma actuator 22 may be operated and/or modulated at a suitable duty cycle and at a frequency that is a multiple of a resonant frequency of the working fluid flow passing by the vortex generators 10. The multiple may include one, two, three, or any other suitable factor. One or more of the sensors 32, 34 may be used in conjunction with the controller 30 to directly or indirectly measure the resonant frequency of the working fluid flow over time. Resonant frequencies of aerodynamic fluid flow are on the order of 100 Hz, and the plasma actuator 22 may be operated and/or modulated over a frequency range of, for example, 1 to 10 kHz. Accordingly, the plasma actuator 22 may be operated and/or modulated to stimulate the resonant frequency of the working fluid flow by "blowing" pulses of ionized fluid into the passing working fluid flow, for example, at the resonant frequency of that flow or at some multiple thereof. This aspect may improve aerofoil maximum coefficient of lift and maximum ratio of lift to drag.

Figure 4:
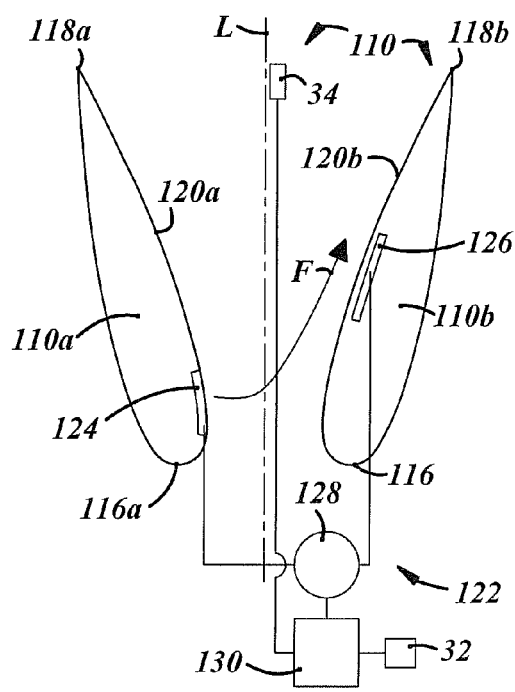
FIG. 4 is a schematic view of one embodiment of a pair of adjacent vortex generators having an AC dielectric barrier discharge plasma actuator distributed amongst the vortex generators.

FIG. 4 illustrates another exemplary embodiment of plasma actuated vortex generators 110. This embodiment is similar in many respects to the embodiment of FIG. 3 and like numerals between the embodiments generally designate like or corresponding elements throughout the several views of the drawing figures. Additionally, the descriptions of the embodiments are incorporated by reference into one another and the common subject matter generally may not be repeated here.

In this embodiment, a plurality of the vortex generators 110 includes a plasma actuator 122 distributed amongst first and second individual vortex generators 110a, 110b of the vortex generators 110. The plasma actuator 122 includes an upstream electrode 124 that may be carried by the first vortex generator 110a, and a downstream electrode 126 that may be carried by the second vortex generator 110b at a location downstream of the upstream electrode 124. More specifically, the upstream electrode 124 may be carried by a vortex generator inboard surface 120a proximate an upstream end 116a of the first vortex generator 110a, and the downstream electrode 126 may be carried by a vortex generator inboard surface 120b proximate a downstream end 118b of the second vortex generator 110b. In another embodiment, the upstream electrode 124 instead may be carried by the second vortex generator 110b, and the downstream electrode 126 may be carried by the first vortex generator 110a. The upstream electrode 124 may be directly exposed to the fluid flow and may be flush with the inboard surface 120a, whereas the downstream electrode 126 may be insulated from the fluid flow and may be buried or recessed with respect to the inboard surface 120b. More specifically, the downstream electrode 126 may be encapsulated or covered by a dielectric material disposed between the electrode 126 and the corresponding inboard surface 120b (or 120a). The dielectric material may be a polyimide material or any other suitable dielectric material(s).

The plasma actuator 122 also includes a relatively high voltage alternating current (AC) power supply 128 in suitable power communication between the upstream and downstream electrodes 124, 126. The plasma actuator 122 also includes a controller 130 in suitable control communication with the power supply 128, and the one or more sensors 32, 34 in suitable monitoring communication with the controller 30.

The plasma actuator 122 may be tuned to actual flight conditions via time-dependent pulsing to improve vortex generator performance and leverage resonant frequencies of the working fluid flow. For example, the plasma actuator 122 may be operated and/or modulated at a suitable duty cycle and at a frequency that is a multiple of a resonant frequency of the working fluid flow passing by the vortex generators 110. The multiple may include one, two, three, or any other suitable factor. One or more of the sensors 32, 34 may be used in conjunction with the controller 30 to directly or indirectly measure the resonant frequency of the working fluid flow over time. Resonant frequencies of aerodynamic fluid flow are on the order of 100 Hz, and the plasma actuator 122 may be operated and/or modulated over a frequency range of, for example, 1 to 10 kHz. Accordingly, the plasma actuator 122 may be operated and/or modulated to stimulate the resonant frequency of the working fluid flow by "blowing" pulses of ionized fluid into the passing working fluid flow, for example, at the resonant frequency of that flow or at some multiple thereof. This aspect may improve aerofoil maximum coefficient of lift and maximum ratio of lift to drag.

Figure 5:
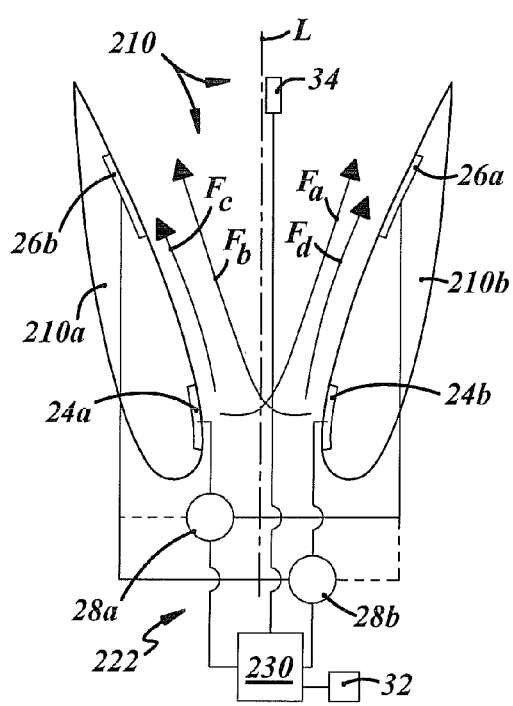
FIG. 5 is a schematic view of one embodiment of a pair of adjacent vortex generators having multiple DC ion wind plasma actuators distributed amongst the vortex generators.

FIG. 5 illustrates another exemplary embodiment of plasma actuated vortex generators 210. This embodiment is similar in many respects to the embodiments of FIG. 3 and like numerals between the embodiments generally designate like or corresponding elements throughout the several views of the drawing figures. Additionally, the descriptions of the embodiments are incorporated by reference into one another and the common subject matter generally may not be repeated here.

In this embodiment, one or more plasma actuators 222 may produce from one to four different fluid flows Fa, Fb, Fc, Fd by way of first and second upstream electrodes 24a, 24b and first and second downstream electrodes 26a, 26b. Each vortex generator 210a, 210b of a plurality of the vortex generators 210 carries an upstream electrode 24a, 24b, respectively, and a downstream electrode 26b, 26a, respectively. Also, the plasma actuator(s) 222 may include two power supplies 28a, 28b and a controller 230 coupled to the power supplies 28a, 28b. Of course, other quantities and arrangements of power supplies and controllers may be used, and FIG. 5 illustrates one example.

In any case, a first fluid flow Fa may be produced by a first plasma actuator including the first upstream electrode 24a and the first downstream electrode 26a, and a second fluid flow Fb may be produced by a second plasma actuator including the second upstream electrode 24b and the second downstream electrode 26b. The first and second fluid flows Fa, Fb are cross-wise fluid flows in that they flow from one vortex generator 210a or 210b to the other vortex generator 210b or 210a across the longitudinal axis L between the generators 210. These fluid flows are envisioned to induce a rotation or swirl to the downstream fluid flow which can augment the capability of the system to delay flow separation.

Moreover, a third fluid flow Fc may be produced by a third plasma actuator including the first upstream electrode 24a and the second downstream electrode 26b, and a fourth fluid flow Fd may be produced by a fourth plasma actuator including the second upstream electrode 24b and the first downstream electrode 26a. The third and fourth fluid flows Fc, Fd are aligned fluid flows in that they flow along the respective vortex generators 210a or 210b and do not cross the longitudinal axis L between the generators 210.

The controller 230 may be programmed and operated in any suitable manner to produce all or fewer of the fluid flows Fa, Fb, Fc, Fd. In fact, the fluid flow described are simplifications of actual combined fluid flows that will be generated by electric fields created by combined voltage potentials on the electrodes. The voltage and phase (DC switching) of each electrode can be controlled to maximize desired fluid flow.

Figure 6:
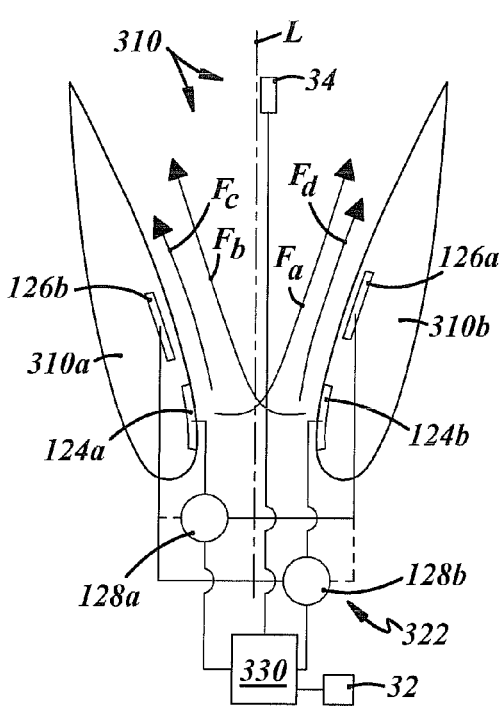
FIG. 6 is a schematic view of one embodiment of a pair of adjacent vortex generators having multiple AC dielectric barrier discharge plasma actuators distributed amongst the vortex generators.

FIG. 6 illustrates another exemplary embodiment of plasma actuated vortex generators 310. This embodiment is similar in many respects to the embodiment of FIG. 4 and like numerals between the embodiments generally designate like or corresponding elements throughout the several views of the drawing figures. Additionally, the descriptions of the embodiments are incorporated by reference into one another and the common subject matter generally may not be repeated here.

In this embodiment, one or more plasma actuators 322 may produce from one to four different fluid flows Fa, Fb, Fc, Fd by way of two upstream electrodes 124a, 124b and two downstream electrodes 126a, 126b. Each vortex generator 310a, 310b of a plurality of the vortex generators 310 carries an upstream electrode 124a, 124b, respectively, and a downstream electrode 126b, 126a, respectively. Also, the plasma actuator(s) 322 may include two power supplies 128a, 128b and a controller 330 coupled to the power supplies 128a, 128b. Of course, other quantities and arrangements of power supplies and controllers may be used, and FIG. 6 illustrates one example.

In any case, a first fluid flow Fa may be produced by a first plasma actuator including a first upstream electrode 124a and a first downstream electrode 126a, and a second fluid flow Fb may be produced by a second plasma actuator including a second upstream electrode 124b and a second downstream electrode 126b. The first and second fluid flows Fa, Fb are cross-wise fluid flows in that they flow from one vortex generator 310a or 310b to the other vortex generator 310b or 310a. These fluid flows are envisioned to induce a rotation or swirl to the downstream fluid flow which will augment the capability of the system to delay flow separation.

Moreover, a third fluid flow Fc may be produced by a third plasma actuator including the first upstream electrode 124a and the second downstream electrode 126b, and a fourth fluid flow Fd may be produced by a fourth plasma actuator including the second upstream electrode 124b and the first downstream electrode 126a. The third and fourth fluid flows Fc, Fd are aligned fluid flows in that they flow along the respective vortex generators 310a or 310b.

The controller 330 may be programmed and operated in any suitable manner to produce all or fewer of the fluid flows Fa, Fb, Fc, Fd. In fact, the fluid flow described are simplifications of actual combined fluid flows that will be generated by electric fields created by combined voltage potentials on the electrodes. The voltage and AC frequency and phase of each electrode can be controlled to maximize desired fluid flow. Pulsing the actuator at the resonant frequency of the flow or at some multiple thereof can also be used to maximize desired impacts to the fluid flow. This aspect may improve aerofoil maximum coefficient of lift and maximum ratio of lift to drag.

Figure 7:
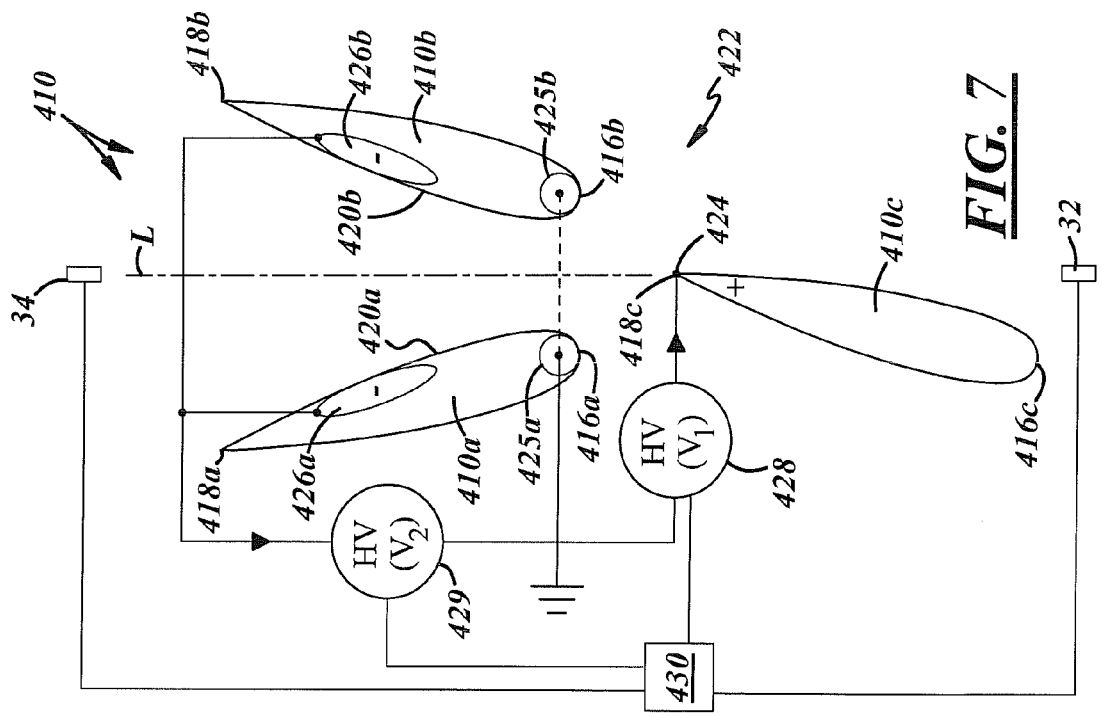
FIG. 7 is a schematic view of one embodiment of a plurality of vortex generators having a DC corona discharge plasma actuator distributed amongst the vortex generators.

FIG. 7 illustrates another exemplary embodiment of plasma actuated vortex generators 410. This embodiment is similar in many respects to the embodiments of FIGS. 3-6 and like numerals between the embodiments generally designate like or corresponding elements throughout the several views of the drawing figures. Additionally, the descriptions of the embodiments are incorporated by reference into one another and the common subject matter generally may not be repeated here.

The vortex generators 410 may include a pair of individual first and second vortex generators 410a, 410b that may be disposed side-by-side or adjacent with respect to one another, and a third individual vortex generator 410c disposed upstream of the other vortex generators 410a, 410b. The vortex generators 410a, 410b, 410c may include upstream ends 416a, 416b, 416c, and downstream ends 418a, 418b, 418c. The pair of vortex generators 410a, 410b also may include inboard surfaces 420a, 420b facing one another at an angle between their respective ends 416a, 416b, 418a, 418b. The vortex generators 10 include a plasma actuator 422 distributed amongst the first, second, and third vortex generators 410a, 410b, 410c.

The plasma actuator 422 includes a first or upstream electrode or anode 424 that may be carried by the third vortex generator 410c, and a pair of second or downstream electrodes or cathodes 426a, 426b that may be carried by the first and second vortex generators 410a, 410b at a location downstream of the upstream electrode 424. More specifically, the anode 424 may be carried, for example, at the downstream end 418c of the third vortex generator 410c, and the cathodes 426a, 426b may be carried by the inboard surfaces 420a, 420b in any suitable location between the ends 416a, 418a, 416b, 418b of the vortex generators 410a, 410b. The electrodes 426a, 426b may be directly exposed to the working fluid flow and may be flush with the inboard surfaces 420a, 420b.

The plasma actuator 422 also includes ground electrodes 425a, 425b disposed downstream of the anode 424 and upstream of the cathodes 426a, 426b. The plasma actuator 22 further includes first and second power supplies 428, 429 in suitable power communication between the anode 424 and cathodes 426a, 426b, a controller 430 in suitable control communication with the power supplies 428, 429, and one or more sensors 32, 34 in suitable monitoring communication with the controller 430. In the illustrated embodiment, the first power supply 428 may be coupled to and between the anode 424 and ground, and the second power supply 429 may be coupled to and between the cathodes 426a, 426b and ground. In the illustrated embodiment, the plasma actuator 422 is a corona discharge ion wind type of device, wherein the power supplies 428, 429 are relatively high voltage direct current (DC) power supplies. Although not separately shown, the power supplies 428, 429 may include any suitable switches, relays, or the like in communication with the controller 430.

Figure 8A:
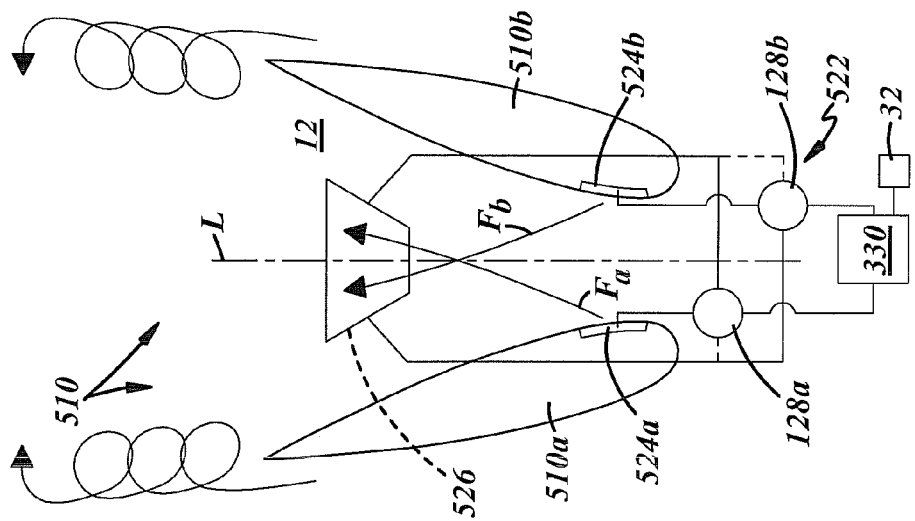
FIG. 8a is a schematic view of one embodiment of a plurality of vortex generators having a plasma actuator distributed amongst the vortex generators and a downstream location of a body surface between the vortex generators.

FIG. 8a illustrates another exemplary embodiment of plasma actuated vortex generators 510. This embodiment is similar in many respects to the embodiments of FIGS. 3-7 and like numerals between the embodiments generally designate like or corresponding elements throughout the several views of the drawing figures. Additionally, the descriptions of the embodiments are incorporated by reference into one another and the common subject matter generally may not be repeated here.

The vortex generators 510 may include a pair of individual first and second vortex generators 510a, 510b that may be disposed side-by-side or adjacent with respect to one another on either side of a longitudinal axis L. The vortex generators 510 include a plasma actuator 522, which is distributed amongst the first and second vortex generators 510a, 510b and in a body surface 12. In this embodiment, the plasma actuator 522 may produce different fluid flows Fa, Fb by way of two upstream electrodes 524a, 524b in the vortex generators 510a, 510b, and one or more downstream electrodes 526 carried by the body surface 12 (buried in the body surface 12 for an AC embodiment or flush with the body surface 12 for a DC embodiment).

One polarity is provided for the upstream electrodes 524a, 524b, and another polarity is provided for the downstream electrode(s) 526. This arrangement is configured to generate an electric field between the vortex generators 510 and induce fluid flow from one or both of the vortex generators 510 to a downstream location on the body surface 12 across a space between the vortex generators 510. Accordingly, this arrangement generates flow acceleration normal to the body surface 12 to increase flow mixing, in addition to acceleration tangential to the body surface 12.

Figure 8B:
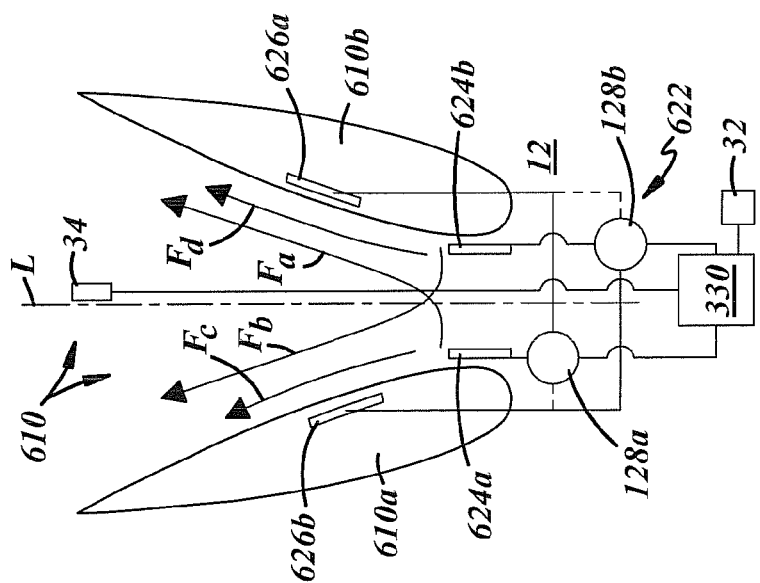
FIG. 8b is a schematic view of one embodiment of a plurality of vortex generators having a plasma actuator distributed amongst the vortex generators and an upstream location of a body surface between the vortex generators.

FIG. 8b illustrates another exemplary embodiment of plasma actuated vortex generators 610. This embodiment is similar in many respects to the embodiments of FIGS. 3-8a and like numerals between the embodiments generally designate like or corresponding elements throughout the several views of the drawing figures. Additionally, the descriptions of the embodiments are incorporated by reference into one another and the common subject matter generally may not be repeated here.

The vortex generators 610 may include a pair of individual first and second vortex generators 610a, 610b that may be disposed side-by-side or adjacent with respect to one another on either side of a longitudinal axis L. The vortex generators 610 include a plasma actuator 622, which is distributed amongst the first and second vortex generators 610a, 610b and in a body surface 12. In this embodiment, the plasma actuator 622 may produce different fluid flows Fa, Fb, Fc, Fd by way of two upstream electrodes 624a, 624b flush with the body surface 12, and two downstream electrodes 626a, 626b carried by the vortex generators 610a, 610b (buried in surfaces of the vortex generators 610a, 610b for an AC embodiment or flush with surfaces of the vortex generators 610a, 610b for a DC embodiment).

One polarity is provided for the upstream electrode(s) 624, and another polarity is provided for the downstream electrodes 626a, 626b. This arrangement is configured to generate an electric field between the vortex generators 610 and induce fluid flow from an upstream location on the body surface 12 to one or more downstream locations on one or both of the vortex generators 610 across a space between the vortex generators 610. Accordingly, this arrangement generates flow acceleration normal to the body surface 12 to increase flow mixing, in addition to acceleration tangential to the body surface 12.

Figure 9:
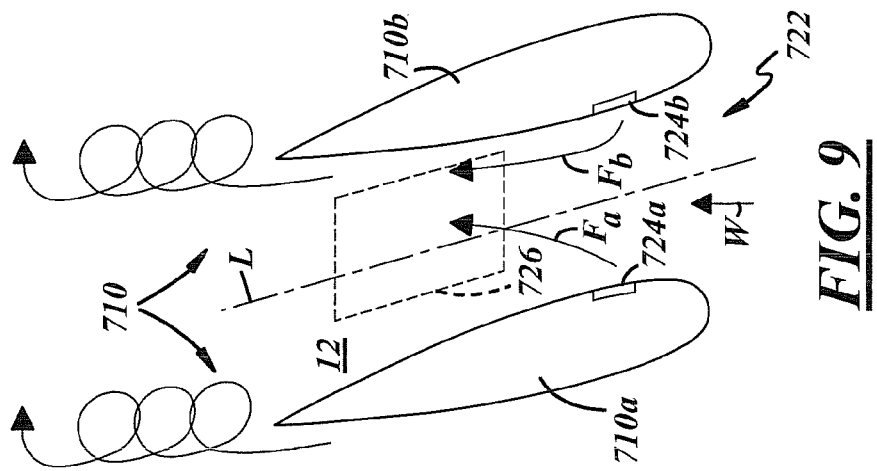
FIG. 9 is a schematic view of one embodiment of a plurality of vortex generators having multiple AC dielectric barrier discharge plasma actuators similar to that shown in FIG. 8 but arranged to create co-rotating vortices.

FIG. 9 illustrates another exemplary embodiment of plasma actuated vortex generators 710. This embodiment is similar in many respects to the embodiments of FIGS. 3-8b and like numerals between the embodiments generally designate like or corresponding elements throughout the several views of the drawing figures. Additionally, the descriptions of the embodiments are incorporated by reference into one another and the common subject matter generally may not be repeated here.

In contrast to the embodiments shown in FIGS. 1-8b which show vortex generators arranged to create counter-rotating vortex pairs, FIG. 9 illustrates an often preferred arrangement designed to create co-rotating vortices in any desired quantity. The vortex generators 710 may include a pair of individual first and second vortex generators 710a, 710b that may be disposed side-by-side or adjacent with respect to one another on either side of a longitudinal axis L equally spaced therebetween. In this embodiment, the vortex generators 710a, 710b may be disposed at similar angles with respect to a direction of travel of a working fluid W. In one embodiment, the vortex generators 710*a*, 710*b* may be disposed parallel to one another on either side of the axis L. In another embodiment, the vortex generators 710*a*, 710*b* may be disposed at an angle relative to one another but in the same direction with respect to the direction of travel of the working fluid W. Of course, this arrangement to produce co-rotating vortices may be applied to any of the aforementioned embodiments of FIGS. 1-8*b*.

The vortex generators 710 include a plasma actuator 722, which is distributed amongst the first and second vortex generators 710*a*, 710*b* and in a body surface 12. In one embodiment, the plasma actuator 722 may produce different fluid flows Fa, Fb by way of two upstream electrodes 724*a*, 724*b* in the vortex generators 710*a*, 710*b*, and one or more downstream electrodes 726 carried by the body surface 12 (buried in the body surface 12 for an AC embodiment or flush with the body surface 12 for a DC embodiment). In another embodiment, one or more upstream electrodes (not shown) may be carried by the body surface 12 and one or more downstream electrodes 726 may be carried by one or both of the vortex generators 710*a*, 710*b*. In both embodiments, the body surface electrode(s) 726 may be offset or biased in favor of one of the vortex generators 710, wherein the electrode(s) 726 is closer to one of the vortex generators than another of the vortex generators. Accordingly, the fluid flows Fa, Fb may be biased toward one side of the longitudinal axis L.

In general, the presently disclosed plasma actuated vortex generators delay, reduce, or prevent separation over at least a portion of a surface of a body exposed to a working fluid, like an airflow over a wing or waterflow over a hull, with concomitant reduction or prevention in drag and inefficiency of the body. The vortex generators may be located in or near a region of separation, in which case, the natural separation point is downstream of the location of the vortex generators. The vortex generators draw higher energy fluid down closer to a body surface, like a wing surface, thereby delaying separation to a point even farther downstream. Also, the presently disclosed plasma actuated vortex generators may generate and accelerate plasma in lower velocity regions of a boundary layer where the ratio of electrostatic body forces to aerodynamic body forces is higher. Although the presently disclosed plasma actuated vortex generators may delay, reduce, or prevent laminar and/or turbulent boundary layer separation, the present invention is not limited to laminar or turbulent boundary layers.

In the past, vortex generators were merely a post-design "fix" for unanticipated aerodynamic issues. Also, conventional plasma actuators arranged on body surfaces suffered from up to a 90% loss in thrust in overcoming viscous forces at body surfaces near the actuators. But the presently disclosed plasma actuated vortex generators can be designed into a product from the outset, with an up to ten-fold efficiency improvement over conventional plasma actuators to enhance product performance.

More specifically, electrodes of plasma actuators can be arranged on adjacent vortex generators to allow electrostatic body forces to accelerate working fluid flow away from a surface of one vortex generator and toward a surface of another vortex generator. This reduces parasitic drag with no loss in flow control capability. This also causes the vortex generators to bring additional high energy fluid closer to a body surface to delay flow separation. Such performance improvements may enable a new breed of loiter airfoils that significantly increase loiter performance. It is believed that the presently disclosed vortex generators may increase the maximum lift to drag ratio at loiter conditions. Such performance enhancement could allow more extreme airfoil shapes to be practical, such as provision of steeper slopes on aft aircraft bodies, larger effective flap or aileron deflections, larger turning angles in inlet ducts, and lower take-off and landing speeds.

Also, the improved plasma actuator efficiency may significantly reduce the duty cycle at which plasma actuators are operated and/or modulated for a concomitant reduction in power consumption. Because of the lower power required to operate the plasma actuators, dozens of the presently disclosed vortex generators can operate on relatively low power, for example, on the order of from 0 to 100 Watts.

Additionally, such performance improvements may enable provision of vortex generators that are smaller in height or of significantly different shapes. Accordingly, the vortex generators may provide an increase in compatibility with survivability requirements and other integration issues like parachute line snag resistance. Smaller height vortex generators may be enabled that result in reduced drag penalties at off-design conditions associated with application of vortex generators. For example, vortex generators designed to improve high lift performance of commercial transports cause a drag penalty during cruise flight. Such shorter vortex generators could perform equally well or better compared to conventional vortex generators at improving high lift performance with significantly reduced penalties during cruise flight.

Moreover, unlike other boundary layer attachment techniques, the presently disclosed vortex generators do not require addition of cavities, bleed air, or moving parts.

The electrode arrangements shown in the various embodiments are illustrative of general principles disclosed herein, but those of ordinary skill in the art will recognize that precise locations and combinations will depend on requirements of specific applications.

Finally, the presently disclosed vortex generators enable plasma actuator pulsing tuned to actual flight conditions for improved boundary layer mixing.

This description, rather than describing limitations of an invention, only illustrates example embodiments of the invention recited in the claims. The language of this description is therefore exclusively descriptive and non-limiting. Obviously, it's possible to modify this invention from what the description teaches. Within the scope of the claims, one may practice the invention other than as described above.

What is claimed is:

1. A plasma-actuated vortex generator arrangement, comprising:
   a plurality of vortex generators in the form of elements that extend from a body surface over which a working fluid flows, the vortex generators being spaced apart from one another along a spaced direction transverse to a direction of travel of the working fluid to allow a working fluid to flow between them; and
   a plasma actuator distributed amongst the plurality of vortex generators and configured to generate an electric field between the vortex generators and induce fluid flow from at least one of the vortex generators to at least one other of the vortex generators across a space between the vortex generators.

2. The plasma-actuated vortex generator arrangement of claim 1, wherein the plurality of vortex generators includes a first vortex generator, and a second vortex generator located adjacent to the first vortex generator, and wherein the plasma actuator includes a first upstream electrode carried by the first vortex generator, and a first downstream electrode carried by the second vortex generator in a location downstream of the first electrode.

3. The plasma-actuated vortex generator arrangement of claim 2, wherein the first upstream electrode is carried by an inboard surface of the first vortex generator proximate an upstream end of the first vortex generator, and the first downstream electrode may be carried by an inboard surface of the second vortex generator proximate a downstream end of the second vortex generator.

4. The plasma-actuated vortex generator arrangement of claim 1 wherein the plasma actuator is operated or modulated a frequency that is a multiple of a resonant frequency of working fluid passing by the vortex generators.

5. The plasma-actuated vortex generator arrangement of claim 1 wherein the plurality of vortex generators includes a first vortex generator, and a second vortex generator located adjacent to the first vortex generator, and wherein the plasma actuator includes a first upstream electrode carried by the first vortex generator, a second upstream electrode carried by the second vortex generator, a first downstream electrode carried by the second vortex generator, and a second downstream electrode carried by the first vortex generator.

6. The plasma-actuated vortex generator arrangement of claim 5, wherein the plasma actuator produces a first fluid flow between the first upstream electrode and the first downstream electrode, and a second fluid flow between the second upstream electrode and the second downstream electrode, wherein the first and second fluid flows are cross-wise fluid flows from one of the vortex generators to another of the vortex generators.

7. The plasma-actuated vortex generator arrangement of claim 6, wherein the plasma actuator produces a third fluid flow between the first upstream electrode and the second downstream electrode, and a fourth fluid flow between the second upstream electrode and the first downstream electrode, wherein the third and fourth fluid flows are aligned fluid flows along the vortex generators.

8. The plasma-actuated vortex generator arrangement of claim 1, wherein the plasma actuator is an AC dielectric barrier discharge plasma actuator.

9. The plasma-actuated vortex generator arrangement of claim 1, wherein the plasma actuator is a DC ion wind plasma actuator.

10. The plasma-actuated vortex generator arrangement of claim 1 wherein the plurality of vortex generators includes a first vortex generator, and a pair of adjacent vortex generators located downstream of the first vortex generator, and wherein the plasma actuator is a DC corona discharge plasma actuator including a first electrode carried by a trailing portion of the first vortex generator, a pair of ground electrodes carried by upstream portions of the pair of adjacent vortex generators, and a pair of second electrodes carried by downstream portions of the pair of adjacent vortex generators.

11. A plasma-actuated vortex generator arrangement, comprising:
a first vortex generator in the form of an element extending from a body surface over which a working fluid flows;
a second vortex generator in the form of an element extending from a body surface over which a working fluid flows located adjacent to and spaced apart from the first vortex generator along a spaced direction transverse to a direction of travel of the working fluid; and
a plasma actuator distributed amongst the first and second vortex generators, and including:
a first electrode carried by the first vortex generator; and
a second electrode carried by the second vortex generator in a location downstream of the first electrode,
the plasma actuator being configured to generate an electric field between the vortex generators and to induce fluid flow from one of the vortex generators to another of the vortex generators across a space between the vortex generators.

12. The plasma-actuated vortex generator arrangement of claim 11, wherein the plasma actuator is an AC dielectric barrier discharge device.

13. The plasma-actuated vortex generator arrangement of claim 11, wherein the plasma actuator is a DC ion wind device.

14. A plasma-actuated vortex generator arrangement, comprising:
a first vortex generator in the form of an element that extends from a body surface over which a working fluid flows;
a pair of adjacent spaced-apart vortex generators in the form of elements that extend from a body surface over which a working fluid flows, the pair of vortex generators being spaced apart from one another along a spaced direction transverse to a direction of travel of the working fluid, to allow a working fluid to flow between them, and located downstream of the first vortex generator; and
a DC corona discharge plasma actuator distributed amongst the vortex generators, and including:
a first electrode carried by a trailing portion of the first vortex generator;
a pair of second electrodes carried by downstream portions of the pair of adjacent vortex generators; and
a pair of ground electrodes between the first and second electrodes and carried by upstream portions of the pair of adjacent vortex generators;
the plasma actuator being configured to generate an electric field between the vortex generators and induces fluid flow across a space between the vortex generators from the first vortex generator to the pair of adjacent vortex generators.

15. The plasma-actuated vortex generator arrangement of claim 14, wherein the plasma actuator includes a first power supply coupled to and between the first electrode and ground, and a second power supply coupled to and between the pair of second electrodes and ground.

16. A plasma-actuated vortex generator arrangement, comprising:
a plurality of spaced-apart vortex generators carried on and extending from a body surface over which a working fluid flows and spaced apart from one another along a spaced direction transverse to a direction of travel of the working fluid; and
a plasma actuator distributed amongst the plurality of vortex generators and the body surface and configured to generate an electric field between a location on the body surface and at least one of the vortex generators and induce fluid flow between the location on the body surface and at least one of the vortex generators across a space between the vortex generators.

17. The plasma-actuated vortex generator arrangement of claim 16, wherein the plasma actuator includes at least one upstream electrode carried by at least one of the vortex generators, and at least one downstream electrode carried by the body surface.

18. The plasma-actuated vortex generator arrangement of claim 16, wherein the plasma actuator includes at least one upstream electrode carried by the body surface, and at least one downstream electrode carried by at least one of the vortex generators.

19. A plasma-actuated vortex generator arrangement, comprising:

a plurality of vortex generators extending away from a body surface over which a working fluid flows, and being spaced apart from one another to allow the working fluid to flow between them, and disposed adjacent with respect to one another on either side of a longitudinal axis L and in the same direction with respect to a direction of travel of a working fluid so as to generate co-rotating vortices; and a plasma actuator distributed amongst at least the plurality of vortex generators and configured to induce fluid flow across a space between the vortex generators.

20. The plasma-actuated vortex generator arrangement of claim 19, wherein the plasma actuator includes at least one electrode carried by at least one of the vortex generators, and at least one other electrode carried by the body surface and offset with respect to a longitudinal axis equally spaced between the vortex generators, wherein the at least one other electrode is closer to one of the vortex generators than another of the vortex generators.

\* \* \* \* \*